United States Patent
Müller (10) Patent No.: US 7,358,297 B2
(45) Date of Patent: Apr. 15, 2008

(54) PREPARATION OF MULTIMODAL POLYMER DISPERSIONS USING POLYMERIC STABILIZER, AND USE THEREOF

(75) Inventor: Harmin Müller, Hattersheim (DE)

(73) Assignee: Celanese Emulsions GmbH (DE)

( * ) Notice: Subject to any disclaimer, the term of this patent is extended or adjusted under 35 U.S.C. 154(b) by 253 days.

(21) Appl. No.: 10/918,121

(22) Filed: Aug. 12, 2004

(65) Prior Publication Data

US 2005/0043463 A1    Feb. 24, 2005

(30) Foreign Application Priority Data

Aug. 13, 2003   (DE) ............................... 103 37 183

(51) Int. Cl.
*B01J 13/14* (2006.01)
(52) U.S. Cl. ...................... 524/557; 524/556; 524/563; 524/459
(58) Field of Classification Search ................ 524/556, 524/557, 563, 459
See application file for complete search history.

(56) References Cited

U.S. PATENT DOCUMENTS

| 4,254,004 A | | 3/1981 | Abbey |
| 4,395,500 A | | 7/1983 | Löhr et al. |
| 4,456,726 A | * | 6/1984 | Siol et al. ................ 524/501 |
| 4,459,726 A | | 7/1984 | Siol et al. |
| 5,990,221 A | | 11/1999 | Dames et al. |
| 6,706,805 B2 | * | 3/2004 | Weitzel ................ 524/563 |
| 2003/0065079 A1 | * | 4/2003 | Weitzel ................ 524/459 |

FOREIGN PATENT DOCUMENTS

| DE | 30 36 969 | 5/1982 |
| DE | 209 837 | 5/1984 |
| DE | 19628142 A1 | 1/1998 |
| EP | 0 081 083 | 6/1983 |
| EP | 0 567 819 | 11/1993 |
| EP | 0 818 471 | 1/1998 |
| WO | WO-84/00369 | 2/1984 |
| WO | WO-90/08786 | 8/1990 |

OTHER PUBLICATIONS

Türk, Ulrich, "Herstellung von Styrol-Butadien-Copolymerdispersionen mit einem speziellen Emulgator-Initiator-System," Die Angewandte Makromolekulare Chemie 46:109-133 (1975).
Lepizzera, S. M., et al, "Nucleation of particles in seeded emulsion polymerization of vinyl acetate with poly(vinyl alcohol) as emulsifier," Macrolol. Chem. Phys. 195:3103-3115 (1994).

* cited by examiner

*Primary Examiner*—Randy Gulakowski
*Assistant Examiner*—M. Bershteyn
(74) *Attorney, Agent, or Firm*—Connolly Bove Lodge & Hutz LLP (57) ABSTRACT

A description is given of a process for preparing bimodal or multimodal polymers from olefinically unsaturated monomers in an aqueous medium.

The process features the introduction as initial charge of selected mixtures of polymeric stabilizers and of at least one selected ionic comonomer.

In the polymerization process the monomer is metered continuously or discontinuously into the said initial charge.

In this way it is possible by means of simple process measures to prepare bimodal or multimodal dispersions.

21 Claims, 5 Drawing Sheets

PREPARATION OF MULTIMODAL POLYMER DISPERSIONS USING POLYMERIC STABILIZER, AND USE THEREOF

The invention relates to a process for preparing multimodal aqueous polymer dispersions by using polymeric stabilizers and corresponding comonomers in a very simple polymerization process which allows safe operation.

Multimodal polymer dispersions are employed in a variety of applications. Deserving of particular emphasis is the field of water-based adhesives, where the requirement is for high solids contents and optimum rheological properties. High solids contents result, for example, in rapid drying and setting of the bond site and hence in the attainment of high strength after a very short time. Optimum rheological properties are important, for example, in the area of machine-applied packaging adhesives. Monomodal dispersions with a high solids fraction become highly viscous or dilatant, owing to the maximum packing density. Bimodal dispersions do not have that drawback.

By bimodal dispersions are meant dispersions whose particles differ in size but have at least two distinctly separate maxima in their size distribution. At a given solids content they have a lower viscosity and exhibit a better rheology.

Polymer dispersions are frequently prepared by emulsion polymerization. This normally produces a suspension containing particles of one size (monodisperse particles). Depending on the way in which the polymerization is performed the size of these particles has a distribution which may be broader or narrower. The solids content in such systems is determined by the maximum packing density of spheres. Accordingly, for example, cubic or hexagonal close packing of hard spheres has a packing density figure of 74% by volume. This means that, in theory, a high solids content of monodisperse spheres with a volume fraction of greater than or equal to 74% by volume is not possible and that the viscosity would then increase to infinity.

For the kind of colloidal systems represented by aqueous polymer dispersions it is not possible to achieve any such maximum packing. Because of the hydrodynamic shell, among other reasons, smaller maximum packing densities are found experimentally. In the majority of cases all that is achieved is what is called "random close packing". The maximum solids content is further reduced by the hydrodynamic effects.

Experimentally the viscosity increases sharply for monodisperse colloidal particles starting from a solids content of 60%. A high solids content on the part of the polymer dispersion, however, is necessary in order to meet the performance properties.

Two particularly important properties for the processing of an adhesive, for example, are the open time and the setting behavior. The open time is a measure of the processing time which is possible while the adhesive has not yet set and the workpieces can still be displaced relative to one another. This time ought to be sufficiently long. In contrast, the bond ought to be very secure after only a very short time, which is reflected in rapid setting behavior. Both are critically controlled by the solids content and/or volume fraction and by the particle size distribution. Achieving a high solids content, in order to obtain optimum setting behavior, with a very low viscosity, in order to ensure machine runability, for example, can only be done by means of a multimodal particle size distribution.

In DE-A-3,036,969 the preparation is described of bimodal dispersions by blending monomodal polymer dispersions having different particle sizes. In that case two different monomodal dispersions are prepared separately and subsequently are mixed with one another in a desired ratio. A drawback of this method is that an additional mixing operation must be introduced, which prolongs the production process and implies higher costs. Moreover, the solids content can only be as high as the solids content of the individual dispersions.

This problem can be circumvented by preparing the bimodal dispersion in situ, with the aid of the seed process, for example.

Lepizzera et al., Macromol. Chem. Phys. 195, 3103-3115 (1994) describe the seeded emulsion polymerization of vinyl acetate with a polyvinyl alcohol (referred to below as "PVA") stabilizer. A seed latex is introduced as an initial charge. The subsequent emulsion polymerization in the presence of PVA produces a second population of particles and hence a bimodal dispersion. With greater molecular weight of the polyvinyl alcohol, more new particles of the second population are formed. In that case, however, the polyvinyl alcohol was dissolved at 20° C. Consequently the second nucleation could also have been triggered by means of PVA in aggregate form (incompletely dissolved form), since it is known that a molecular polyvinyl alcohol solution is achievable only with dissolution at not less than 85° C. (cf. Mowiol® brochure from Kuraray Specialities Europe GmbH or KSE).

DE-A-4,213,696 and DE-A-3,147,008 describe the preparation of bimodal dispersions by using a blend as seed. Two dispersions having different particle sizes are mixed and used as a seed for an emulsion polymerization. As with the seed process already mentioned above, in both cases the seed must be prepared beforehand, which implies increased cost and inconvenience.

DD-A-209,837 discloses a process where the polymerization is initiated continuously in two or more reaction vessels connected in parallel upstream of the polymerization vessel(s) until the particle formation phase is concluded. A drawback with this process is the large number of reaction vessels.

U. Türk in Die Angewandte Makromolekulare Chemie 46 (1975), 109-133, describes how by using an emulsifier during polymerization it is possible to obtain a bimodal particle size distribution as a result of secondary nucleation. In that case, though, it is necessary to add an emulsifier at a defined point in time during the polymerization process.

U.S. Pat. No. 4,254,004 discloses the production of bimodal particle size distributions by means of a two-stage process, where the rate of monomer metering has to be altered during the process.

EP-A-818,471 describes the production of bimodal particle size distributions through the use of a miniemulsion seed.

With none of these prior art processes for producing bimodal particle size distributions is there a simple process regime.

Known processes require either a plurality of vessels/reactors or an intervention in the process, such as the non-continuous addition of a further component, for example, or involve costly and inconvenient pre-preparation (e.g., seed).

It was therefore an object of the present invention to provide a new, simple process for producing bimodal or multimodal particle size distributions in aqueous polymer dispersions while at the same time reducing the known, associated drawbacks, such as the inconvenient regime, to a minimum.

Another object of the present invention was to find a process which is easy to carry out using conventional polymerization apparatus and leads to bimodal or multimodal polymer dispersions having high solids contents.

Surprisingly it has been found that these objects are achieved by a process for preparing aqueous polymer dispersions having multimodal (or at least bimodal) particle size distributions, specifically using a combination of selected polymeric stabilizers and ionic comonomers in an emulsion polymerization process.

The present invention relates to a process for preparing aqueous polymer dispersions having an at least bimodal particle size distribution by emulsion-polymerizing at least two ethylenically unsaturated monomers in the presence of polyvinyl alcohol, comprising
- a) initially introducing from 0.1 to 12% by weight, based on the total weight of all the monomers used to prepare the polymer dispersion, of a molecularly or dispersely water-soluble polymer, preferably a polyvinyl alcohol, whose molecular weight is at least 1.5 times the molecular weight of the polymer of component b),
- b) initially introducing from 0.1 to 12% by weight, based on the total weight of all the monomers used to prepare the polymer dispersion, of a further molecularly or dispersely water-soluble polymer, preferably a further polyvinyl alcohol, having a molecular weight of at least 10 000 g/mol,
- c) initially introducing from 0.01 to 2% by weight, based on the total weight of all the monomers used to prepare the polymer dispersion, of at least one ionic comonomer, which is an α,β-monoethylenically unsaturated compound containing at least one group derived from a weak acid, and
- d) adding at least one ethylenically unsaturated, free-radically polymerizable monomer and an initiator of free-radical emulsion polymerization to the mixture comprising components a), b) and c).

The process of the invention constitutes an emulsion polymerization where the monomer is metered in continuously or discontinuously.

It produces bimodal or multimodal aqueous polymer dispersions. By bimodality or multimodality is meant for the purposes of this description a particle size distribution having two or more than two, respectively, distinctly pronounced maxima (as measured with the Malvern Mastersizer Micro Plus and evaluated using the "Mie polydisperse" model). Characteristic of the process of the invention is the initial introduction of a combination of selected stabilizers and selected comonomers followed by the addition of the remaining monomer(s).

As a stabilizer mixture use is made of different water-soluble or water-dispersible polymers, preferably polyvinyl alcohols and/or modifications thereof. They differ primarily in their molecular weight.

Examples of polymeric stabilizers are water-soluble or water-dispersible, polymeric substances of nature, such as starch; water-soluble or water-dispersible, polymeric, modified substances of nature, such as cellulose ethers, e.g., methyl-, ethyl-, hydroxyethyl- or carboxymethylcellulose, or starch modified using saturated acids or epoxides; water-soluble or water-dispersible, polymeric, synthetic substances, such as polyethylene oxides and copolymers thereof, such as polyethylene oxide/polypropylene oxide, polyvinyl alcohol (with or without a residual acetyl content), polyvinyl alcohol which is partly esterified or acetalized or etherified with saturated radicals, and polypeptides, such as gelatin, and also polyvinylpyrrolidone and its copolymers, such as polyvinylpyrrolidone/polyvinyl acetate, polyvinylmethylacetamide or poly(meth)acrylic acid.

Preferred polymeric stabilizers are cellulose ethers, polyethylene oxides, modified starches and, in particular, polyvinyl alcohols and/or modifications thereof.

The polymeric stabilizers employed in step a) and step b) differ only in their molecular weights or differ both in their molecular weights and in their chemical composition.

These polymeric stabilizers are already present in the initial charge, as a result of steps a) and b), and may also be added during the polymerization. Further amounts thereof may additionally be added after the polymerization as well.

The polymeric stabilizers employed in steps a) and b) must be soluble or dispersible in water at 20° C., where appropriate after temperature treatment beforehand.

By average molecular weights are meant for the purposes of this description, unless specified otherwise, weight averages (g/mol). The molecular weights are determined by means of aqueous gel permeation chromatography (GPC) on a SunChrom apparatus. The sample concentration is 3.5 mg/ml with an injection volume of 100 µl. The samples are filtered over Teflon (1 µm). Detection is by means of an RI detector (35° C.). Elution is with 80:20 water/acetone (0.05% by weight Na nitrate). Columns used are the models Suprema 100, 1000 and 3000 from PSS. The column temperature is 45° C. The standard used is polyethylene oxide.

The molecular weight of the polymer used in step a) is at least 1.5 times, preferably at least 2 times, in particular from 3 to 10 times that of the polymer used in step b).

The molecular weight of the component used in step a) is preferably in the range from 30 000 to 300 000 g/mol.

The molecular weight of the polymer used in step b) is at least 10 000, preferably at least 15 000 g/mol.

Where polyvinyl alcohol is used as a component in step a) and/or b) the parameter stated with preference, rather than the molecular weight, is the viscosity of a 4% strength aqueous solution at 25° C. (measured using the Höppler viscometer).

In step a) it is preferred to use a polyvinyl alcohol whose viscosity in 4% strength aqueous solution at 25° C. is less than or equal to 60 mPa*s.

In step b) it is preferred to use a polyvinyl alcohol whose viscosity in 4% strength aqueous solution at 25° C. is at least 4 mPa*s and whose molecular weight is at least 1.5 times below the corresponding figure for the component used in step a).

Polyvinyl alcohol is generally prepared by hydrolyzing polyvinyl acetate.

Suitable polyvinyl alcohol preferably possesses a degree of hydrolysis of from 50 to 100 mol %, more preferably from 70 to 100 mol %, and its aqueous solution possesses a viscosity at 25° C. of from 2 to 70 mPa*s.

Particular suitability is possessed by polyvinyl alcohols having a degree of hydrolysis of from 80 to 99 mol %, more preferably from 87 to 99 mol %, and having a viscosity of the 4% strength aqueous solution at 25° C. of from 3 to 50 mPa*s, preferably from 3 to 40 mPa*s.

These specified viscosities, and those below, refer in each case to measurements using the Höppler viscometer.

Further suitable and particularly preferred polyvinyl alcohols may have been hydrophilically or hydrophobically modified in any way whatsoever.

Examples of hydrophobically modified polyvinyl alcohols, which do not contain water-soluble monomer units in their main chain, are ethylene-containing polyvinyl alcohols of the Exceval® type from KSE. It is also possible, though, for other comonomers to be present in the polyvinyl alcohol. The distribution of comonomers in the polyvinyl alcohol may be blockwise and/or random.

Another preferred possibility is that of modification to the polyvinyl alcohol by means of any desired side-chain reactions, preference being given to modification of the alcohol groups. For example, the alcohol groups of the polyvinyl alcohol can be subjected to partial acetalization, allowing the polyvinyl alcohols to be furnished with any desired radicals, which may be either hydrophobic or hydrophilic, in particular with $C_{1-12}$ alkyl radicals, very particular preference being given to polyvinyl alcohols modified with butyl radicals, as described in DE-A-196 50 831.

The acetalized hydroxyl groups are preferably radicals having the following structure:

where $R_1$ is alkyl, cycloalkyl, aryl or aralkyl and $R_2$ is hydrogen, alkyl, cycloalkyl, aryl or aralkyl.

Alkyl stands for straight-chain or branched alkyl groups which have preferably 1 to 10, in particular 1 to 8, carbon atoms. Examples of alkyl groups are methyl, ethyl, n-propyl, isopropyl, n-butyl, tert-butyl and n-hexyl.

Aryl is preferably phenyl or naphthyl. If the aryl radical is a phenyl group and is substituted, it preferably has two substituents. These substituents are present in particular in positions 2 and/or 4.

Aralkyl is preferably benzyl.

Cycloalkyl is in particular $C_3$-$C_6$ cycloalkyl, particular preference being given to cyclopentyl and cyclohexyl. $R_1$ and $R_2$ may also together form a cycloalkyl radical.

The modified radicals can be arranged blockwise or at random.

It is also possible, however, to use polyvinyl alcohols having other modifications.

The radicals in question are preferably those having the following structure:

where $R_1$ is as defined above.

The distribution of the hydrophobic and/or hydrophilic groups can be arbitrary and makes it possible, among other things, to control the particle size distribution.

Thus the modified groups may be present alongside one another (in blockwise distribution) or they may be distributed at random.

The grafting reaction may lead to complete conversion of the hydroxyl groups in the polyvinyl alcohol or else only to partial conversion.

The mixtures of polymeric stabilizers used in accordance with the invention, preferably the mixtures of polyvinyl alcohols and/or modified derivatives thereof, are dissolved preferably at the beginning of the polymerization (normally in water) and introduced as an initial charge for two to three hours at at least 85° C., preferably at least 90° C., and prior to the polymerization.

The weight ratios of the higher and lower molecular weight stabilizers, in particular the polyvinyl alcohols (i.e., components a and b), can be between 1:99 and 99:1.

It is preferred to use components a) and b) in weight ratios of between 10:90 and 90:10, more preferably between 20:80 and 80:20.

Preferably the polyvinyl alcohol used in step b) in a 4% strength aqueous solution has a Höppler viscosity of at least 3.5 mPa*s, more preferably from 4 to 10 mPa*s, very preferably from 4 to 8 mPa*s; the polyvinyl alcohol used in step a) in a 4% strength aqueous solution has a Höppler viscosity of at least 7.5 mPa*s, more preferably from 8 to 50 mPa*s and very preferably from 8 to 40 mPa*s; and the molecular weight of the polyvinyl alcohol used in step a) is at least 1.5 times that of the polyvinyl alcohol used in step b).

The total amount of the polymeric stabilizers used, which are employed preferably as an initial charge but may also be added in fractions by metering, particularly of the polyvinyl alcohols and/or modified derivatives thereof, is typically from 1 to 15% by weight, preferably from 3 to 11% by weight and more preferably from 4 to 11% by weight, based on the total weight of all the monomers used for preparing the polymer dispersion.

It will be appreciated that during the emulsion polymerization it is possible to use further stabilizers in addition to the polymeric stabilizers employed in accordance with the invention, such as low molecular weight emulsifiers, based for example on sulfates, sulfonic acids, carboxylic acids or polyethylene oxide or copolymers thereof, or further polymeric stabilizers having molecular weights deviating from those of components a) and b), such as cellulose ethers, polyethylene oxides, starch derivatives or additional polyvinyl alcohols. These further stabilizers may be present even in the initial charge, together with components a), b) and c), or may be added during the polymerization.

It is possible to include the total amount of stabilizer in the initial charge right at the beginning of the emulsion polymerization or else—which is preferable—to include a fraction of the stabilizer in the initial charge at the beginning and to add the remainder continuously or in one or more steps after the polymerization has been initiated. This addition can take place separately or together with other components, such as monomers and/or initiators, or else in the form of a monomer emulsion.

Examples of suitable ionic comonomers include α,β-monoethylenically unsaturated monocarboxylic and dicarboxylic acids, such as acrylic acid, methacrylic acid, maleic acid, fumaric acid, itaconic acid and their water-soluble salts; further suitable ionic comonomers are phosphoric or phosphonic esters with ethylenically unsaturated groups, such as vinyl phosphonate or methacryloylethyl phosphate, for example.

In accordance with the invention the ionic comonomers of component c) are initially introduced in amounts between 0.01 to 2% by weight.

The process of the invention is suitable for preparing bimodal or multimodal aqueous polymer dispersions by free-radical emulsion polymerization of monomers containing at least one ethylenically unsaturated group.

Monomers containing at least one monoethylenically unsaturated group that are suitable for the process of the invention include the free-radically polymerizable monomers which are known per se.

These are, for example, aromatic or aliphatic, α,β-unsaturated, optionally halogen-substituted hydrocarbons, such as ethene, propene, 1-butene, 2-butene, vinyl chloride, vinylidene chloride, styrene, α-methylstyrene and o-chlorostyrene, preference being given to ethene; and/or esters of vinyl alcohol with monocarboxylic acids having one to eighteen carbon atoms, such as vinyl acetate, vinyl propionate, vinyl n-butyrate, vinyl laurate, vinyl stearate and Versatic acid vinyl esters; and/or esters of α,β-monoethylenically unsaturated monocarboxylic and dicarboxylic acids having preferably three to six carbon atoms, such as especially acrylic acid, methacrylic acid, maleic acid and itaconic acid, with alkanols having generally one to twelve, preferably one to eight and in particular one to four carbon atoms, such as especially methanol, ethanol, n-butanol, isobutanol or 2-ethylhexanol, particularly methyl, ethyl, n-butyl, isobutyl and 2-ethylhexyl esters of acrylic acid and of methacrylic acid, dimethyl maleate or di-n-butyl maleate; and/or nitriles of α,β-mono-ethylenically unsaturated carboxylic acids, such as acrylonitrile; and/or conjugated dienes having four to eight carbon atoms, such as 1,3-butadiene and isoprene.

The stated monomers generally constitute the principal monomers, which, based on the total amount of the monomers to be polymerized by the process of free-radical aqueous emulsion polymerization, normally account for a fraction of more than 45% by weight.

As a general rule these monomers are of only moderate to low solubility in water under standard conditions (25° C., 1 atm).

It will be appreciated that further comonomers can be added, modifying the properties in some targeted way. Such monomers are normally copolymerized merely as modifying monomers, in amounts, based on the total amount of the monomers to be polymerized, of less than 50% by weight, generally from 0.5 to 20% by weight, preferably from 1 to 10% by weight.

Monomers which customarily enhance the internal strength of films formed from the aqueous polymer dispersions normally contain at least one epoxy, hydroxyl, N-methylol or carbonyl group, or at least two nonconjugated ethylenically unsaturated double bonds.

Examples of such are N-alkylol amides of α,β-monoethylenically unsaturated carboxylic acids containing three to ten carbon atoms, among which very particular preference is given to N-methylolacrylamide and N-methylol-methacrylamide, and also esters thereof with alkanols containing one to four carbon atoms. Also suitable are monomers containing two vinyl radicals, monomers containing two vinylidene radicals and monomers containing two alkenyl radicals.

Particularly advantageous in this context are the diesters of dihydric alcohols with α,β-monoethylenically unsaturated monocarboxylic acids, preferably acrylic and methacrylic acid.

Examples of monomers of this kind containing two non-conjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate and 1,4-butylene glycol dimethacrylates, and also divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate.

Also of particular importance in this context are the $C_1$-$C_9$ hydroxyalkyl esters of acrylic and methacrylic acid, such as n-hydroxyethyl, n-hydroxypropyl or n-hydroxybutyl acrylate and methacrylate, and also compounds such as diacetone acrylamide and acetylacetoxyethyl acrylate and methacrylate.

It is also possible in addition to use organosilicon monomers of the general formula $R^3Si(CH_3)_{0-2}(OR^4)_{3-1}$, where $R^3$ has the definition $CH_2=CR^4$-$(CH_2)_{0-1}$ or $CH_2=CR^5CO_2$—$(CH_2)_{1-3}$, $R^5$ is a branched or unbranched, optionally substituted alkyl radical having three to twelve carbon atoms, which may be optionally interrupted by an ether group, and $R^4$ is H or $CH_3$.

Examples of such are vinylmethyldimethoxysilane, vinylmethyldiethoxysilane, vinylmethyldi-n-propoxysilane, vinylmethyldiisopropoxysilane, vinylmethyidi-n-butoxysilane, vinylmethyldi-sec-butoxysilane, vinylmethyidi-tert-butoxysilane, vinylmethyidi(2-methoxyisopropyloxy)silane and vinylmethyidioctyloxysilane.

The aforementioned monomers are copolymerized mostly in amounts of from 0.2 to 10% by weight in the case of free-radical heterophase polymerization, preferably in the case of free-radical aqueous emulsion polymerization, based on the total amount of the monomers to be polymerized.

The preparation of aqueous polymer dispersions has been widely described and is therefore known to the skilled worker [cf., e.g., Encyclopedia of Polymer Science and Engineering, Vol. 8, p. 659 ff (1987)].

It takes place preferably by emulsion polymerization of monomers containing at least one olefinically unsaturated group in the presence of a preferably water-soluble polymerization initiator and in the presence of stabilizers and also, optionally, emulsifiers and optionally customary further additives. Alternatively it may be conducted in other heterophase systems, provided steps a) to d) defined above are carried out.

In general the monomers are added by means of continuous feed; it is, however, also possible to include a fraction of the monomers, up to 25% by weight, for example, in the initial charge.

The polymerization of the ethylenically unsaturated monomers in accordance with the invention takes place in the presence of at least one initiator for the free-radical polymerization of ethylenically unsaturated monomers.

Suitable initiators for the free-radical polymerization, for initiating and continuing the polymerization during the preparation of the dispersions, include all known initiators which are capable of initiating a free-radical aqueous polymerization in heterophase systems.

These initiators may be peroxides, such as alkali metal and/or ammonium peroxodisulfates, for example, or azo compounds, especially water-soluble azo compounds.

As polymerization initiators it is also possible to use what are known as redox initiators. Examples thereof are tert-butyl hydroperoxide and/or hydrogen peroxide in combination with reducing agents, such as with sulfur compounds, e.g., with the sodium salt of hydroxymethanesulfinic acid, sodium sulfite, sodium disulfite, sodium thiosulfate and acetone-bisulfite adduct, or with ascorbic acid or with reducing sugars.

The amount of the initiators or initiator combinations used in the process of the invention is within the range of what is customary for aqueous polymerizations in heterophase systems. In general the amount of initiator used will not exceed 5% by weight, based on the total amount of the monomers to be polymerized.

Preferably the amount of initiators used, based on the total amount of the monomers to be polymerized, is from 0.05 to 2.0% by weight.

The total amount of initiator can be introduced right at the beginning of the polymerization or, preferably, a fraction of the initiator is introduced at the beginning and the remainder is added in one or more steps, or continuously, after the polymerization has been initiated. Addition may take place separately or together with other components, such as emulsifiers.

The molecular weight of the polymers of the aqueous dispersions can be adjusted by adding small amounts of one or more substances which regulate the molecular weight. These "regulators", as they are known, are used generally in an amount of up to 2% by weight, based on the monomers to be polymerized. Any of the substances known to the skilled worker can be used as regulators. Preference is given, for example, to organic thio compounds, silanes, allyl alcohols and aldehydes.

The aqueous dispersion may further comprise a number of other substances, such as plasticizers, preservatives, pH modifiers and/or defoamers, for example.

The polymerization temperature is generally from 20 to 150 and preferably from 60 to 120° C.

The polymerization takes place under superatmospheric pressure if desired. As additional emulsifiers it is possible in particular to use anionic emulsifiers or nonionic dispersants in an amount in particular of from 0.05 to 4% by weight of the total monomer amount in addition to the polyvinyl alcohol.

Following the actual polymerization reaction it may be desirable and/or necessary substantially to free the resultant aqueous polymer dispersion from odoriferous substances, such as residual monomers and other volatile organic constituents, for example. This can be done in a conventional manner physically, for example by distillative removal (in particular by steam distillation) or by stripping with an inert gas. The reduction in the amount of residual monomers can also be accomplished chemically by means of free-radical postpolymerization, in particular under the action of redox initiator systems, as are described in DE-A-4,435,423, for example. Preference is given to postpolymerization with a redox initiator system composed of at least one organic peroxide and also an organic and/or inorganic sulfite and/or sulfinic acid derivatives.

Particular preference is given to a combination of physical and chemical methods, where after the residual monomer content has been lowered by chemical postpolymerization it is lowered further by means of physical methods to preferably <1000 ppm, more preferably <500 ppm, in particular <100.

The monomer components can be included in the initial charge or judiciously metered in during the polymerization at a uniform rate or in metering profiles. The very simple regime is deserving of particular emphasis. There is no need either for a seed or for the use of complex apparatus or combinations thereof. The process is a simple monomer metering process.

The polymerization of the invention is normally conducted at a pH in the region of less than/equal to 9. To adjust the pH of the polymer dispersion it is possible in principle to use buffer systems, such as sodium acetate, for example. Preferably a pH range of from 2 to 9 is favorable, preference being given to a pH in the range between 3 and 8.

The solids content of the dispersions prepared in accordance with the invention is typically between 45 and 74% by weight, preferably between 49 and 70% and more preferably between 50 and 70%. The weight figures refer in this case to the overall mass of the dispersion.

The bimodal or multimodal dispersions prepared in accordance with the invention are especially suitable for preparing coating materials (such as paints or food coatings), adhesives (for bonding wood, paper and/or polymer films) and chemical products for the construction industry, and also for finishing textiles and paper. The invention further provides for the use of these dispersions for such purposes.

The dispersions prepared in accordance with the invention may likewise be converted advantageously by spray drying into powders which are used in chemical products for the construction industry and in adhesives.

The examples which follow illustrate the invention without limiting it.

Polyvinyl Alcohols

The number quoted in first position in the type designation of the polyvinyl alcohols used characterizes the viscosity of the 4% strength aqueous solution at 20° C., as a relative measure of the degree of polymerization of the polyvinyl alcohol; the second number indicates the degree of hydrolysis (degree of saponification) of the polyvinyl acetate on which the type is based (partly hydrolyzed and fully hydrolyzed polyvinyl alcohol types).

The data are subject to the customary fluctuations advised by the manufacturer; that is, the viscosity may have a fluctuation of ±0.5 mPa*s, the degree of hydrolysis a fluctuation of ±1 mol %.

Measurement of Particle Size Distribution

The particle size distribution measurement was conducted using the Mastersizer Micro Plus laser diffraction instrument from Malvern. The scatter data were evaluated using the "polydisperse Mie" or "multimodal Mie" model provided by Malvern.

Since this diffraction experiment does not yield any information on the morphology, light micrographs were taken additionally, using a differential interference contrast microscope from Leitz. The combination of these two methods allows conclusions concerning the quantity and the morphology of the particle size distributions.

Determination of the Setting Behavior on Wood

The setting behavior was tested using beech sections (15.5×2×0.3 cm) which had been stored under standard conditions beforehand (23° C., 50% relative humidity). An area of 15 mm×20 mm was coated on one side with dispersion at 150 g/m$^2$.

A second test section was placed on the coated film and the two sections were compressed at 0.7 N/mm$^2$. The press time was 2.5 min and 5 min in each case.

The force to fracture was determined on 10 test specimens. The mean value based on a defined area (in N/mm$^2$) corresponds to the setting behavior after 2.5 and 5 min respectively.

EXAMPLES 1a TO 5a

Inventive, 60% Form, Different PVA Ratios

The liquor consisted of 62 parts by weight (based on the principal monomer amount) of deionized water, X parts by weight of a polyvinyl alcohol 26-88 (where X is in example 1a=1.5 ppw, 2a=2.5 ppw, 3a=3.5 ppw, 4a=4.5 ppw, 5a=5.5 ppw), Y parts by weight of a polyvinyl alcohol 4-88 (where Y is in example 1a=8.5 ppw, 2a=7.5 ppw, 3a=6.5 ppw, 4a=5.5 ppw, 5a=4.5 ppw), 0.1 part by weight of sodium acetate, 0.5 part by weight of methacrylic acid and 10 parts by weight of the principal monomer, vinyl acetate.

Polymerization was initiated by adding 0.05 part by weight of ammonium peroxodisulfate at 65° C. After the beginning of polymerization the remainder of the principal monomer and an aqueous solution of 0.02 part by weight of ammonium peroxodisulfate and 6 parts by weight of water were metered in over the course of 5 hours. Polymerization was carried out with stirring using a close-clearance anchor stirrer at between 70 and 85° C.

EXAMPLE 6

Inventive, 50% Form

The liquor consisted of 100 parts by weight (based on the principal monomer amount) of deionized water, 3.5 parts by weight of a polyvinyl alcohol 26-88, 6.5 parts by weight of a polyvinyl alcohol 4-88, 0.1 part by weight of sodium acetate, 0.5 part by weight of methacrylic acid and 10 parts by weight of the principal monomer, vinyl acetate. Polymerization was initiated by adding 0.05 part by weight of ammonium peroxodisulfate at 65° C. After the beginning of polymerization the remainder of the vinyl acetate and an aqueous solution of 0.02 part by weight of ammonium peroxodisulfate and 6 parts by weight of water were metered in over the course of 5 hours. Polymerization was carried out with stirring using a close-clearance anchor stirrer at between 70 and 85° C.

EXAMPLE 7

Inventive, Acrylic Acid

Preparation as per example 3a, but without the use of methacrylic acid. Instead the same amount of acrylic acid was used.

EXAMPLE 8

Inventive, Butyraldehyde-Modified Polyvinyl Alcohol

Preparation as per example 4a, but using a butyraldehyde-modified polyvinyl alcohol instead of polyvinyl alcohol 26-88.

EXAMPLE 9

Exceval®, Inventive

Preparation as per example 4a, but using Exceval® AQ4105 L instead of polyvinyl alcohol 4-88.

COMPARATIVE EXAMPLE C1

No Methacrylic Acid, Monomodal

Preparation as per example 3a but without the use of methacrylic acid.

COMPARATIVE EXAMPLE C2

Only One Polyvinyl Alcohol (High Molecular Weight, Monomodal

Preparation as per example 3a but without the use of a low molecular weight polyvinyl alcohol. Instead 10 ppw of the high molecular weight PVA (polyvinyl alcohol 26-88) were used.

RESULTS

The results are shown in the figures. Specifically:

FIG. 1 (1a and 1b) shows a bimodal particle size distribution obtained by the process of the invention.

Figure 1A:
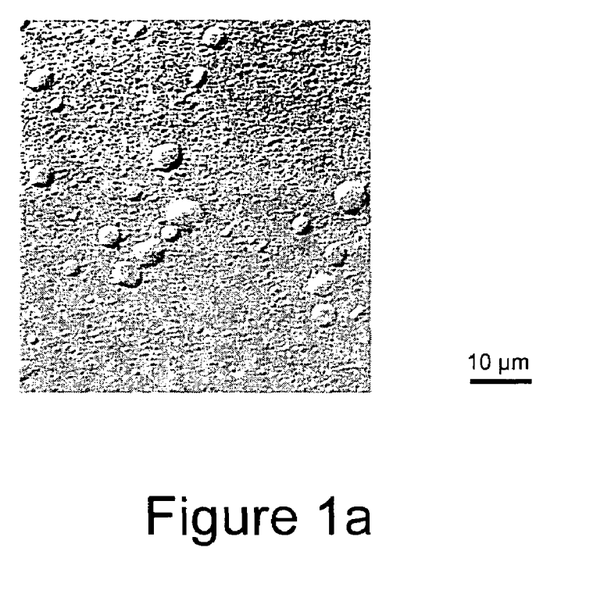

FIG. 1a depicts the particle morphology of the inventively prepared bimodal dispersion of example 3a, viewed in differential interference contrast light microscopy.

Figure 1B:
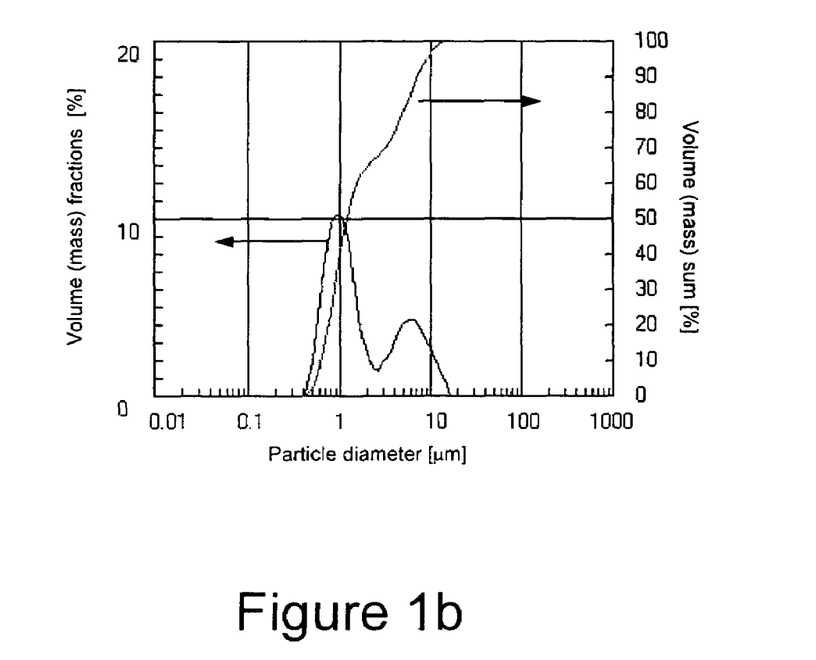

FIG. 1b shows the particle size distribution of this bimodal dispersion. Measurement was made using the Mastersizer Micro Plus (polydisperse Mie evaluation).

Figure 2:
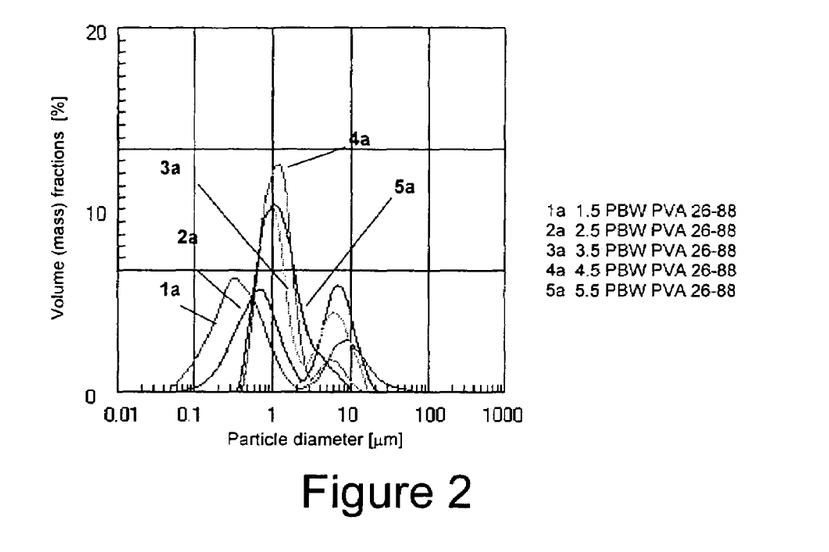
FIG. 2 shows different particle size distributions prepared by varying the proportions in the polyvinyl alcohol, with different proportions of small and larger particles.

In FIG. 2 it is apparent that by varying the ratios in the polyvinyl alcohol it is possible to produce virtually any desired particle size distributions with almost any desired ratios of small and larger particles. In this figure the change in the particle size distribution of the inventively prepared dispersion of examples 1a -5a by varying the PVA ratios is shown (the total amount of PVA remains constant). Measurement was carried out with the Malvern Mastersizer Micro Plus, evaluated using the "polydisperse Mie" model.

Figure 3:
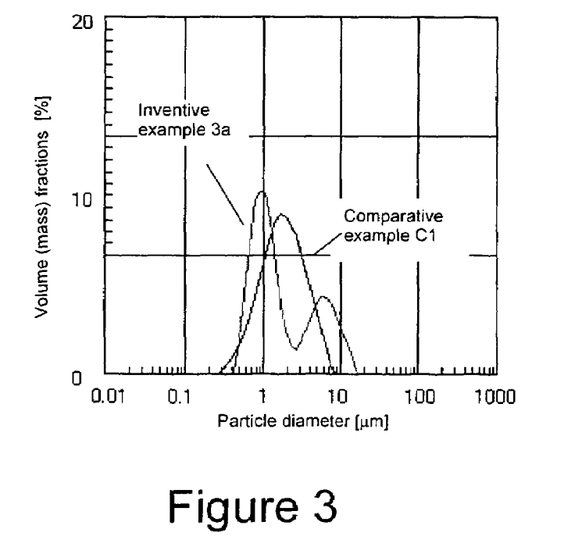
FIGS. 3 to 8 show the particle size distributions of different dispersions prepared by the inventive process or by comparative processes.

In FIG. 3 an inventively prepared bimodal dispersion (of example 3a) is compared with a comparative dispersion (comparative example C1) prepared without ionic comonomer. Measurement was carried out with the Malvern Mastersizer Micro Plus, evaluated using the "polydisperse Mie" model.

Figure 4:
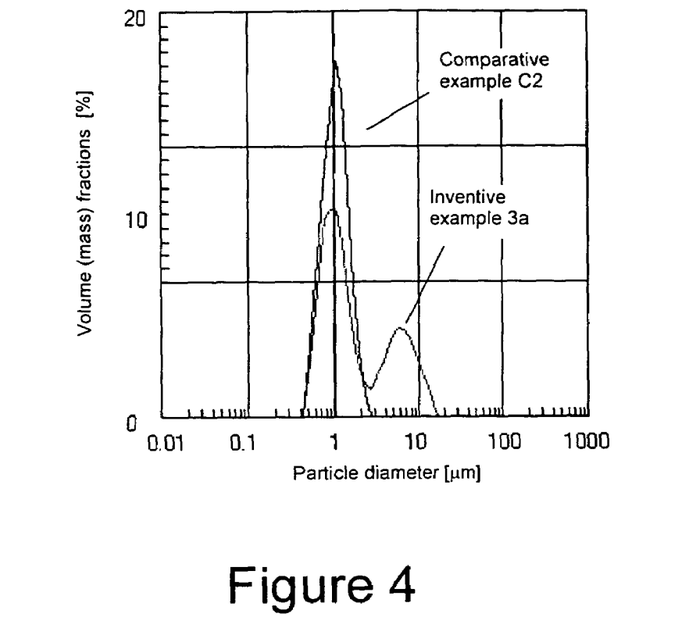

In FIG. 4 an inventively prepared bimodal dispersion (of example 3a) is compared with a comparative dispersion (comparative example C2) prepared without low molecular weight polyvinyl alcohol (polyvinyl alcohol 4-88). Measurement was carried out with the Malvern Mastersizer Micro Plus, evaluated using the "polydisperse Mie" model.

Figure 5:
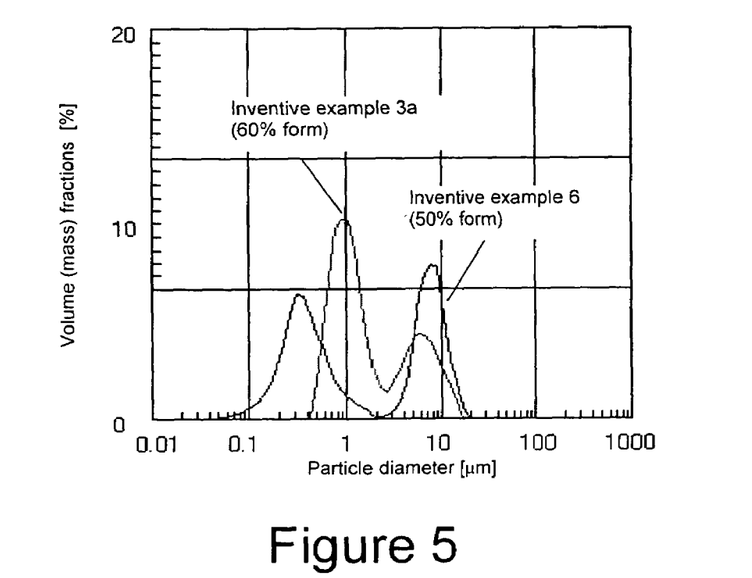

In FIG. 5 inventively prepared bimodal dispersions (of example 3a (60% formed) and of example 6 (50% formed)) are shown. Measurement was carried out with the Malvern Mastersizer Micro Plus, evaluated using the "polydisperse Mie" model.

Figure 6:
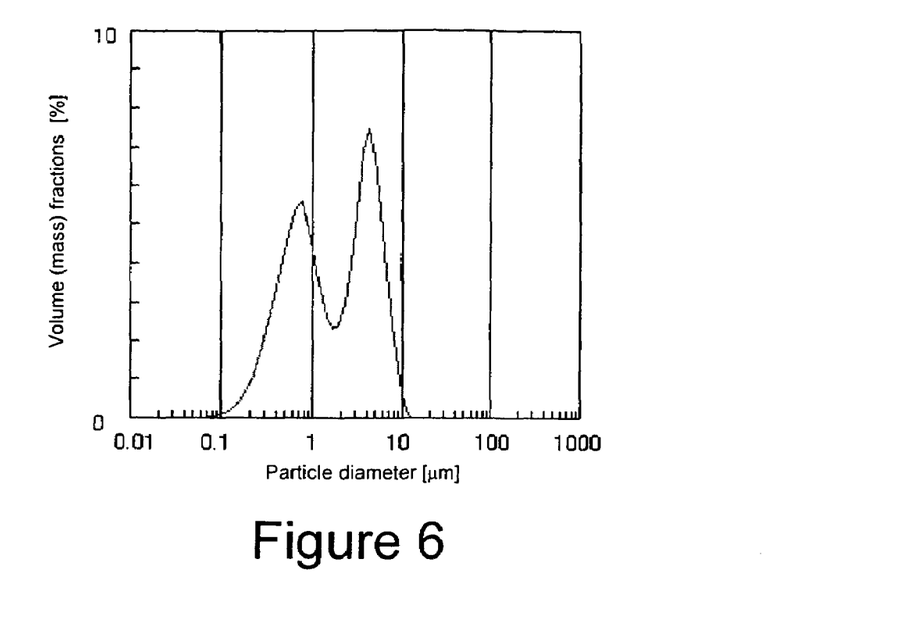

In FIG. 6 inventively prepared bimodal dispersions (of example 7 with a different carboxylic acid as ionic comonomer (acrylic acid)) are shown. Measurement was carried out with the Malvern Mastersizer Micro Plus, evaluated using the "polydisperse Mie" model.

Figure 7:
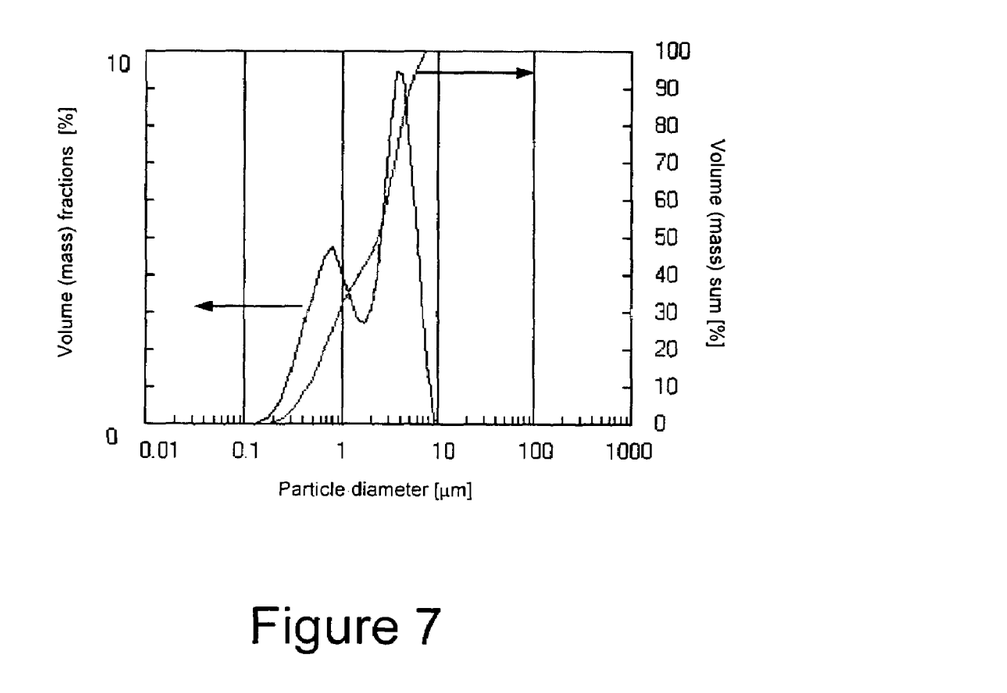

In FIG. 7 an inventively prepared bimodal dispersion of example 8 with a butyraldehyde-modified polyvinyl alcohol is shown. Measurement was carried out with the Malvern Mastersizer Micro Plus, evaluated using the "polydisperse Mie" model.

Figure 8:
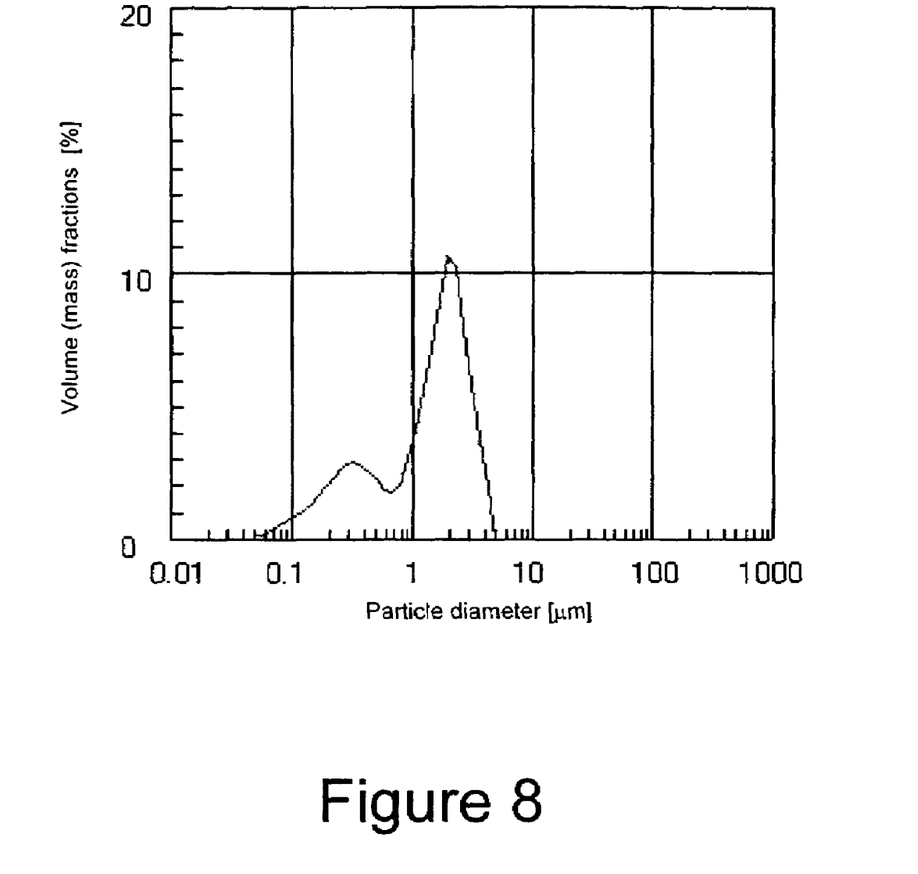

In FIG. 8 an inventively prepared bimodal dispersion of example 8 with a hydrophobically modified polyvinyl alcohol of the Exceval® type is shown. Measurement was carried out with the Malvern Mastersizer Micro Plus, evaluated using the "polydisperse Mie" model.

The results depicted in FIGS. 2 to 8 were confirmed by the morphological analyses by means of differential interference contrast light microscopy.

Table 1 below shows the viscosities of the inventively prepared bimodal dispersions in comparison with the monodisperse dispersion.

TABLE 1

| Dispersion | Example 3a inventive bimodal | Example C1 comparative monomodal |
|---|---|---|
| Brookfield viscosity (spindle 7, 21° C.) in mPas | 23 000 | 78 000 |
| Volume fraction of small particles (approx. < 1 μm) in % | 73 | 100 |
| Volume fraction of large particles (approx. 5 μm) in % | 27 | 0 |

Table 1 shows that the viscosity of the dispersion of the invention is lower by a factor of approximately 3 than that of the corresponding monomodal comparative dispersion. This corresponds to the expected effect in terms of improved packing in the case of a bimodal dispersion.

Table 2 below shows the setting behavior of three different dispersions having different solids contents and particle size distributions, with a comparable viscosity and composition.

TABLE 2

| Dispersion | Example C3 comparative monomodal | Example 1b inventive bimodal | Example 2b inventive bimodal |
|---|---|---|---|
| Solids content in % | 50 | 50 | 60 |
| Setting behavior after 2.5 min in N/mm² | 1.9 | 2.8 | 3.2 |
| Setting behavior after 5 min in N/mm² | 3.2 | 4.5 | 5.0 |

Table 2 shows the setting behavior of three different dispersions. Dispersion C3 is a monomodal 50% comparative dispersion. Example 1b shows that with the same solids content a bimodal system prepared inventively possesses a distinctly improved setting behavior. An even better setting behavior is observed for a bimodal 60% dispersion prepared inventively, which can be prepared only by means of the process of the invention: otherwise the viscosities attained are too high and are impossible to handle (cf. C1 in Tab. 1).

What is claimed is:

1. A process for preparing aqueous polymer dispersions having an at least bimodal particle size distribution by emulsion-polymerizing at least two ethylenically unsaturated monomers in the presence of polyvinyl alcohol, comprising
    a) initially introducing from 0.1 to 12% by weight, based on the total weight of all the monomers used to prepare the polymer dispersion, of a molecularly or dispersely water-soluble polymer, whose molecular weight is at least 1.5 times the molecular weight of the polymer of component b),
    b) initially introducing from 0.1 to 12% by weight, based on the total weight of all the monomers used to prepare the polymer dispersion, of a further molecularly or dispersely water-soluble polymer, having a molecular weight of at least 10,000 g/mol,
    c) initially introducing from 0.01 to 2% by weight, based on the total weight of all the monomers used to prepare the polymer dispersion, of at least one ionic comonomer, which is an α,β-monoethylenically unsaturated compound containing at least one group derived from a weak acid, and
    d) adding at least one ethylenically unsaturated, free-radically polymerizable monomer and an initiator of free-radical emulsion polymerization to the mixture comprising components a), b) and c);
    with the proviso that seed lattices are not employed in said process.

2. The process as claimed in claim 1, wherein said molecularly or dispersely water-soluble polymers used in steps a) and b) are selected from the group consisting of cellulose ethers, polyethylene oxides, modified starches, polyvinyl alcohols, modified polyvinyl alcohols and mixtures thereof.

3. The process as claimed in claim 2, wherein the molecularly or dispersely water-soluble polymer used in step a) and step b) is in each case a polyvinyl alcohol, a main-chain-modified or side-chain-modified polyvinyl alcohol, or a combination thereof.

4. The process as claimed in claim 3, wherein the polyvinyl alcohol used in step b) in a 4% strength aqueous solution has a Höppler viscosity of at least 3.5 mPa*s, and the polyvinyl alcohol used in step a) in a 4% strength aqueous solution has a Höppler viscosity of at least 7.5 mPa*s and the molecular weight of the polyvinyl alcohol used in step a) is at least 1.5 times the molecular weight of the polyvinyl alcohol used in step b).

5. The process as claimed in claim 1, wherein the molecularly or dispersely water-soluble polymer of step a) possesses a molecular weight of more than 50,000 g/mol and wherein the molecularly or dispersely water-soluble polymer of step b) possesses a molecular weight of less than 50,000 g/mol.

6. The process as claimed in claim 1, wherein the water-soluble or water-dispersible polymers used in steps a) and b) are polyvinyl alcohols each possessing a molar degree of hydrolysis of at least 80%.

7. The process as claimed in claim 2, wherein said polyvinyl alcohols are modified by graft reactions on the alcohol groups.

8. The process as claimed in claim 7, wherein said polyvinyl alcohols are modified by partial acetalization of the alcohol groups with $C_{1-12}$ alkyl groups.

9. The process as claimed in claim 1, wherein said ethylenically unsaturated free-radically polymerizable monomers in step d) are esters of vinyl alcohol and monocarboxylic acids containing 1 to 18 carbon atoms.

10. The process as claimed in claim 9, wherein said ethylenically unsaturated free-radically polymerizable monomers in step d) are vinyl acetate, ethene, Versatic acid vinyl esters, or combinations thereof.

11. The process as claimed in claim 9, wherein said ethylenically unsaturated free-radically polymerizable monomers in step d) are vinyl acetate.

12. The process as claimed in claim 1, wherein the ionic comonomer in step c) carries at least one carboxylic acid group.

13. The process as claimed in claim 12, wherein the ionic comonomer in step c) is acrylic acid or methacrylic acid or a combination thereof.

14. The process as claimed in claim 1, wherein the pH of the polymerization medium is between about 1 to about 12.

15. The process as claimed in claim 1 wherein the molecularly or dispersed, water-soluble polymers of step a) is at least 1.5 times the molecular weight of the polymer of step b).

16. The process as claimed in claim 1 wherein the molecularly or dispersed, water-soluble polymer in step b) has a molecular weight of at least 10,000 g/mol.

17. The process as claimed in claim 4 wherein the polyvinyl alcohol used in step b) in a 4% strength aqueous solution has a Höppler viscosity of between about 4 to about 10 mPa*s.

18. The process as claimed in claim 4 wherein the polyvinyl alcohol used in step a) in a 4% strength aqueous solution has a Höppler viscosity of between about 8 to about 50 mPa*s.

19. The process as claimed in claim 6 wherein the water soluble or water dispersible polymers used in steps a) and b) are polyvinyl alcohols each possessing a molar degree of hydrolysis greater than or equal to 85%.

20. The process as claimed in claim 9 wherein said esters of vinyl alcohol and monocarboxylic acids containing 1 to 18 carbons is selected from the group consisting of vinyl acetate, vinyl propionate, vinyl n-butyrate, vinyl laurate, vinylstearate, Versatic acid vinyl esters, aromatic or aliphatic α,β-unsaturated optionally halogen-substituted hydrocarbons, and combinations thereof.

21. The process as claimed in claim 20 wherein said aromatic or aliphatic α,β-unsaturated, optionally halogen-substituted hydrocarbons are selected from the group consisting of ethene, propene, 1-butene, 2-butene, vinyl chloride, vinylidene chloride, styrene, α-methylstyrene and o-chlorostyrene.

* * * * *